United States Patent [19]
Pate, Sr.

[11] Patent Number: 4,927,403
[45] Date of Patent: May 22, 1990

[54] HIGH VOLTAGE INSULATIVE SHAFT COUPLER

[76] Inventor: Kenneth D. Pate, Sr., 801 Greenwood Ave. East, Waukegan, Ill. 60087

[21] Appl. No.: 273,420

[22] Filed: Nov. 18, 1988

Related U.S. Application Data

[63] Continuation-in-part of Ser. No. 17,446, Feb. 24, 1987, abandoned.

[51] Int. Cl.⁵ .................. F16D 3/76; F16D 7/02
[52] U.S. Cl. .................. 464/30; 384/297; 384/905.1; 464/89; 464/900
[58] Field of Search .............. 384/235, 236, 297, 300, 384/905.1; 403/225, 226, 372; 464/30, 51, 87, 89, 91, 147, 150, 160, 180, 182, 185, 900, 903

[56] References Cited

U.S. PATENT DOCUMENTS

| | | | |
|---|---|---|---|
| 1,786,720 | 12/1930 | Moore et al. | 403/226 X |
| 1,864,080 | 6/1932 | Madge | 464/89 X |
| 1,941,061 | 12/1933 | Thiry | 464/89 |
| 1,960,688 | 5/1934 | Archer | 464/89 X |
| 2,468,985 | 5/1949 | Krotz | 464/89 X |
| 2,476,894 | 7/1949 | Mulheim | 464/89 X |
| 2,879,090 | 3/1959 | Everitt et al. | 464/91 X |
| 2,962,312 | 11/1960 | Wanner | 464/30 |
| 3,068,664 | 12/1962 | Tocci-Guilbert | 464/89 |
| 3,080,735 | 3/1963 | Blom, Jr. et al. | 464/900 X |
| 3,137,148 | 6/1964 | Kayser | 464/89 |
| 3,146,612 | 9/1964 | Lorenz | 464/89 X |
| 3,226,950 | 1/1966 | Leto | 464/900 X |
| 3,609,994 | 10/1971 | Colletti et al. | 464/903 X |
| 3,859,821 | 1/1975 | Wallace | 464/89 |
| 3,873,863 | 3/1975 | Pew | 464/900 X |
| 4,626,112 | 12/1986 | Kramer | 464/89 X |

FOREIGN PATENT DOCUMENTS 3524504 8/1986 Fed. Rep. of Germany ........ 74/492

Primary Examiner—Daniel P. Stodola
Attorney, Agent, or Firm—Thomas E. Smith

[57] ABSTRACT

The high voltage electrically insulative safety coupler for moling or earth augering equipment prevents high voltage electric shock to the equipment operator. The coupler is composed of first and second coupler elements, with the second coupler element including a shaft surrounded by an elastomeric retention member formed of a dielectric material such as polyurethane capable of withstanding high voltages of on the order of 50 kilovolts without breaking down. The retention member is compressed within a cavity in the first coupler element and frictionally engages the interior walls of the cavity. A hard dielectric guide bearing member fixed in position at the bottom of the cavity partially surrounds the second coupler element and prevents lateral movement of the shaft at the cavity bottom, and a second hard dielectric collar closely surrounds the shaft at the top of the cavity and fits at least partially within the cavity to prevent lateral movement of the shaft at the cavity top. A retainer spaced from the shaft is affixed over the collar to hold the collar and retention member in place. Thus the two coupler elements are totatlly separated from one another by dielectric material but are frictionally engaged to rotate together by the compressed retention member.

8 Claims, 1 Drawing Sheet

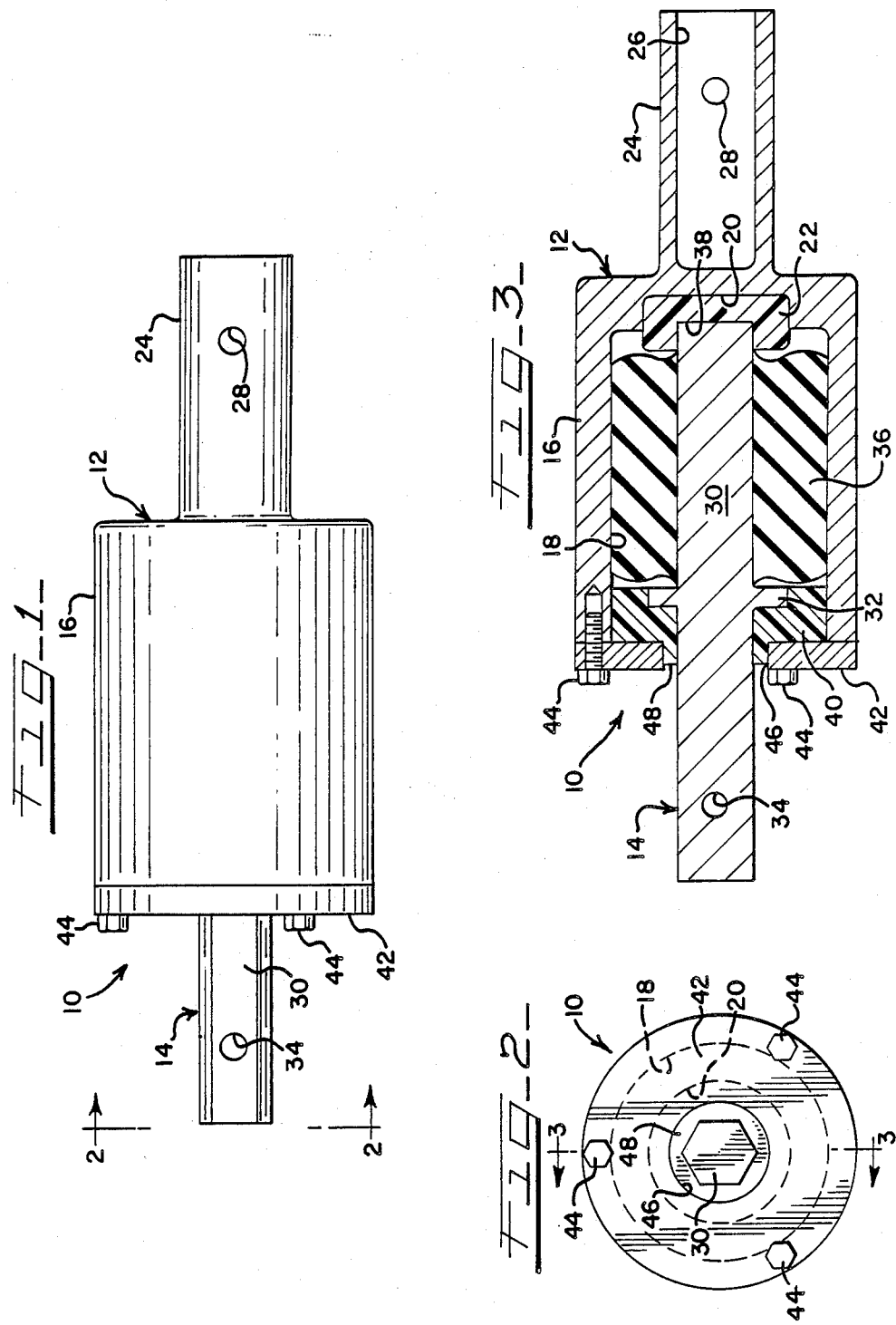

HIGH VOLTAGE INSULATIVE SHAFT COUPLER

This is a continuation in part of application Ser. No. 17,446 filed Feb. 24, 1987, now abandoned.

BACKGROUND OF THE INVENTION

This invention relates to high voltage insulative shaft couplings, and in particular to an electrically insulative safety coupling which couples the two shaft members without positive mechanical interconnection and in a manner which will prevent high voltage electrical currents, i.e., voltages of on the order of up to about 50 kilovolts, from passing from one shaft member to the other. The coupler of this invention is particularly adapted to couple an underground moling auger or drill bit to the drilling machine, so that if a buried high voltage electrical cable is accidentally hit, the operator of the auger will be fully protected from electrical shock.

An earth moling operation can be quite dangerous if there is buried high voltage cable in the area. While precautions are taken to avoid hitting such a cable during the moling operation, the location of the buried cable might not always be accurately known or the operator may unwittingly aim his moler in a direction of the high voltage cable. If the high voltage cable is hit, there is great danger of electrocution because such cables typically carry up to about 50 kilovolts of electricity.

Shaft couplers are well known. For example, U.S. Pat. No. 4,348,672 discloses a coupler having driven and driving members separated by a dielectric material. The material is held in place and the driven and driving members are interconnected by a positive mechanical connection, set forth in several embodiments of this patent.

Other patents disclose other forms of couplers which, again, form positive mechanical interconnection between a driven portion and the driving portion of the coupler. Further examples are U.S. Pat. Nos. 3,402,572 (utilizing an adhesive), 2,449,654 (using fasteners to connect to an intermediate pad), 3,306,078 (using an undulating configuration to mechanically interconnect shaft portions), and 939,829 (utilizing a flexible disk having lugs which interengage the driving and driven shafts). Whenever a positive mechanical interconnection is provided, normally costs of formation of the elements and assembly of the shaft coupler are increased.

Of even greater importance, the devices of the prior art are incapable of preventing the passage of high voltage electrical current and of preventing electric shock should the driven auger accidentally hit a buried high voltage electrical cable. Even if the auger should hit an obsticle it may slip in rotation but the metallic parts will never come into contact. Thus the mechanism is fail-safe against metal-to-metal contact and electrical continuity.

SUMMARY OF THE INVENTION

The present invention provides an electrically insulative shaft coupler which will prevent the transmission of high voltage, i.e., voltage of on the order of 50 kilovolts. The shaft coupler is composed of two coupler elements. The first coupler element has a hollow housing which includes a cylindrical interior cavity having an inner diameter of a first dimension. The second coupler element includes an elongated shaft which is considerably smaller in diameter than the interior cavity and is formed to fit within the cavity. A cylindrical elastomeric retention member formed of a highly insulative dielectric material such as polyurethane is affixed to the shaft. The retention member has an outer diameter of a second dimension, with the second dimension being greater than the first dimension. The shaft and retention member are installed axially within the cavity such that the retention member is compressed so that the outer diameter of the retention member is equal to the first dimension of the interior of the cavity of the housing. The retention member, and therefore the shaft, is retained within the cavity without positive mechanical connection of the retention member to the housing.

In accordance with the disclosed embodiment of the invention, a depressed seat is formed at the bottom of the housing cavity in registration with an end of the shaft. A hard, highly electrically insulative bearing is located in the seat between the end of the shaft and the cavity. This bearing is preferably formed of a phenolic resin, and it serves as a first guide for the shaft of the second coupler element. The shaft preferably has a transversely extending flange within the cavity, and a collar formed of a hard, highly electrically insulative material is snugly fitted about the shaft and the flange. The collar has an outer diameter which is substantially equal to the inner diameter of the cavity, so that it may rather snugly fit within the cavity to prevent any lateral movement of the shaft within the top of the cavity, just as the bearing prevents lateral movement of the shaft at the bottom of the cavity. A retainer surrounds the shaft but is spaced therefrom, and this retainer is secured to the housing. The collar is therefore sandwiched between the retainer and the flange, with the shaft passing through a central aperture in the retainer for mechanical connection to a further shaft or other driven element. It is desired that the dielectric collar have a neck portion which extends through the central aperture in the retainer. This serves to increase resistance to arcing should a high voltage be applied to one side of the coupler.

BRIEF DESCRIPTION OF THE DRAWINGS

The invention is described in greater detail in the following description of an example embodying the best mode of the invention, taken in conjunction with the drawing figures, in which:

FIG. 1 is a side elevational view of an assembled high voltage insulative shaft coupler according to the invention, FIG. 2 is an end elevational view of the high voltage insulative shaft coupler according to the invention taken in direction 2—2 of FIG. 1, looking toward the removable retainer cover, and FIG. 3 is a cross-sectional illustration of the coupler according to the invention, taken along lines 3—3 of FIG. 2.

DESCRIPTION OF AN EXAMPLE EMBODYING THE BEST MODE OF THE INVENTION

The electrically insulative shaft coupler according to my invention is designated generally at 10 in the drawing figures. The shaft coupler 10 consists of two primary components, a first coupler element 12 and a second coupler element 14. In use, typically one of the coupler elements will be secured to a drilling machine and the other coupler element will be secured to an auger or drill bit for moling into the earth for the installation of buried electrical cable.

The first coupler element 12 includes a hollow housing 16 having a cylindrical inner cavity 18 of a constant inner diameter, as shown. The inner cavity 18 is provided with a circular seat 20 which accomodates a bearing element 22, described in somewhat greater detail below.

For coupling to an auger or drill bit or other driving element, the first coupler element 12 includes an extending hollow shaft 24 having a socket 26 into which an auger or drill bit or the like (not illustrated) can be installed and locked into place by means of a pin passing through opposite apertures 28 in the shaft 24. Other means of connection of a driving source to the coupler element 12 may be employed in place of the shaft 24, as will be readily apparent.

The second coupler element 14 is composed of shaft 30 having an integral flange 32 formed thereabout, as illustrated. The shaft 30 is hexagonal and the flange 32 is generally circular in cross-section. The shaft 30 extends beyond the housing 18, and is provided with an aperture 34 for coupling, for example, to a power driven drill or auger machinery (not illustrated).

A cylindrical elastomeric retention member 36 is secured to the shaft 30. Preferably, the retention member 36 is composed of a flexible, compressible, highly dielectric material which is appropriately, permanently affixed to the shaft 30, such as by molding. The composition of the material is important. It must be capable of withstanding up to 50 kilovolts of electricity without breaking down and conducting. As used herein the term "high voltage" shall mean voltages of up to about 50 kilovolts. Ordinary rubber, for example, will not do since this has been found to break down at under about 250 volts. Nevertheless, the material must be highly compressible and it must have no significant deterioration in its properties by heat, cold, or aging. It has been found that polyurethane is ideal. The polyurethane should have a hardness of 65 to 75 A durometer, with 70 A durometer being preferred. If the hardness is below 65 A durometer, the material is too soft and holds a set, whereas if the hardness is too great, i.e., above 75 A, the material cannot be compressed to load it into the cavity 18 as will now be described.

When the retention member 36 is formed, its outer diameter is larger than that of the inner diameter of cavity 18 of the housing 16, so that when the shaft 30 and retention member 36 are installed within the cavity 18, the retention member 36 must be compressed, and is therefore tightly retained within the housing 16 without any positive mechanical connection to the housing 16. The term positive mechanical connection is intended to mean a physical connection, as by adhesives, fasteners such as bolts or screws, or irregular formation of the exterior surface of the retention member 36 with corresponding formation of the inner cavity 18. In all such instances, the elements are fixed one to another, and cannot be rotated relative to one another without damage to parts or removal of required fasteners. Because the inner cavity 18 is cylindrical and the outer surface of the retention member is likewise cylindrical (although larger in diameter), there is a smooth interface between the retention member 36 and the wall of the cavity 18, permitting rotation between these two elements of the invention, resisted, of course, by the resilient friction between the two, an additional safety feature described below.

In the preferred embodiment, the inner diameter of the housing cavity 18 is 3¼ inches and the uncompressed retention member 36 is 3⅞. It has been found that polyurethane material spreads evenly within the cavity 18 and actually takes up the entire cavity leaving very little if any void.

As shown in FIG. 3, the shaft 30 butts against the hard, highly dielectric bearing element 22, which is formed with an inner depression 38 for accomodating the end of the shaft 30, as illustrated. This depression is essential to centering the shaft 30 as will be described. The bearing element 22 must be formed of a highly electrically insulative material capable of withstanding up to 50 kilovolts of electricity without breaking down. This material, however, must be hard because the bearing with its depression 38 serves as a guide for the end of the shaft 30. It is preferred that the material be a thermoset resin, and a linen fiber reinforced phenolic resin has been found satisfactory.

A collar 40 is installed on the shaft 30 adjacent the flange 32. The collar 40 is formed of a hard, highly dielectric material which is capable of withstanding high voltages of up to 50 kilovolts without breakdown. This collar is preferably formed of the same material as the bearing element 22, and acts as a second centering guide for the shaft 30. The outer diameter of the hard centering collar is approximately the same diameter as the inner cavity 18 so that it may be slid into the cavity over the end of the retention member 36. This collar prevents any wobbling of the shaft relative to the housing 16. An annular metal retainer 42 is installed on the housing 16 by means of a series of screws 44 of similar fasteners. The retainer 42 forms a cover for the cavity 18, and includes a circular aperture 46 sufficiently large, not only so that the shaft 30 may pass freely therethrough without contact, but also large enough so that at 50 kilovolts, there will be no arcing across the collar between the shaft 30 and the retainer 42. To provide increased stability and to minimize the possibility of arcing, the collar 40 is preferably formed with an annular neck-like extension 48 which occupies the space between the aperture defining portion of the retainer 42 and the shaft 30. This serves not only to reinforce the collar 40 and thus the shaft 30 from any lateral movement at the top of the cavity, but it further insulates the shaft from the retainer and prevents arcing should high voltage be applied to one side of the coupler. When the retainer 42 is in place, as illustrated, the hard guide collar 40 is positioned between the retainer 42 and the flange 32 as well as between the flange and the walls of the cavity 18 and between the retainer aperture defining portion and the shaft 30, to assure proper positioning of the second coupler element 14 to the first coupler element 12, with the end of the shaft 30 firmly seated within the depression 38 of the hard insulative bearing element 22.

The shaft coupler 10 is formed and assembled as follows. First, the coupler elements 12 and 14 are formed as illustrated. Before the shaft 30 is installed within the housing 16, the retention member 36 is formed with its outer diameter greater than the diameter of the inner cavity 18. The retention member 36 is then permanently installed on the shaft 30, by molding or other appropriate means. Just prior to insertion of the shaft 30 within the cavity 18, the bearing element 22 is placed about the end of the shaft 30, and the shaft, with the bearing element 22 and retention member 36, is installed within the cavity 18, the retention member 36 being compressed as necessary to be accommodated within the smaller diameter of the cavity 18. Finally, the collar 40 is placed on the shaft 30, adjacent the flange 32, and the retainer 42 is attached to the housing 16 by means of the screws 44. Thus the hard dielectric guide collar 40 will be positioned between the retainer 42 and the shaft flange 32 and the outwardly extending portion of the shaft 30.

The relative size of the outer diameter of the retention member 36 with relation to the diameter of the inner cavity 18 will depend on many factors, including the compressibility of the material 36, the coefficient of friction of the outer surface of the retention member 36, the coefficient of friction of the inner cavity 18, and the amount of torque that may be applied to the shaft coupler 10. Clearly, it is a desired result of the invention to transmit all torque from the coupler element 12 to the coupler element 14 without slippage between the retention member 36 and the inner cavity 18 under normal conditions.

The shaft coupler 10 is adapted to be used as a high voltage insulative coupling device in such items as moling drills or augers. If the auger or moling bit accidentally hits a high voltage electrical cable, the coupler will prevent any electricity from being conducted therethrough to possibly electrocute the operator. Also, the shaft coupler 10 can be used as a safety clutch for drills, augers and other types of driven shafts so that if the second coupler element 14 is bound for any reason, the first coupler element 12 will slip relative to the second coupler element 14 at the interface between the inner cavity 18 and the retention member 36. While the coupler 10 may thus be destroyed by resulting friction, more expensive components are not, and the coupler can readily be repaired by replacement of the retention member 36, and bearing element 22 and collar 40, if also damaged or destoryed. Therefore, in addition to being an effective, yet inexpensive insulative shaft coupler, the coupler 10 can also perform as a safety clutch.

Various changes can be made to the invention without departing from the spirit thereof or scope of the following claims.

What is claimed is:

1. A high voltage electrically insulative shaft coupler, comprising
  a. A first coupler element having a hollow housing, said housing including a cylindrical interior cavity having an inner diameter of a first dimension,
  b. a second coupler element including an elongated shaft, said shaft being formed to fit within said cavity, and
  c. a cylindrical, flexible elastomeric retention member secured to said shaft, and said retention member having an outer diameter of a second dimension, said second dimension being greater than said first dimension, said retention member being formed of a dielectric material capable of withstanding high voltage of on the order of 50 kilovolts without breakdown,
  d. said shaft retention member being installed axially within said housing cavity; such that said retention member is compressed so that the outer diameter of said retention member is equal to said first dimension, whereby said retention member and said shaft will be axially rotated when said first coupler element housing is rotated,
  e. a dielectric first guide means located centrally adjacent the bottom of said cavity in axial registration with the interior of said cavity and with the end of said shaft within said cavity, said first guide means being capable of withstanding high voltage and being formed to receive said shaft end and being sufficiently hard and unyielding to retain said shaft end in position in axial registration with the interior of said cavity and prevent substantial lateral movement thereof,
  f. a dielectric guide collar adjacent the top of said cavity in close fitting relationship with the cavity defining portions of said hollow housing and in close fitting surrounding relationship with respect to said shaft, said guide collar being capable of withstanding high voltage and being sufficiently hard and unyielding to prevent substantial lateral movement of the portions of said shaft adjacent the top of said cavity, and
  g. retaining means for retaining said guide collar in place adjacent the top of said cavity,
  h. whereby said second coupler element shaft will be held in place and prevented from substantial lateral movement by said first guide means adjacent the bottom of said cavity and by said guide collar adjacent the top of said cavity and will be electrically insulated from said first coupler element by said first guide means, said guide collar and said intermediate elastomeric retention member.

2. The high voltage electrically insulative coupler of claim 1 wherein said retaining means includes a retainer removably secured to said first coupler element hollow housing adjacent the top of said cavity and and having a central opening, with the opening defining portions of said retainer being in spaced relationship with respect to and electrically insulated from said second coupler element shaft to maintain said retention member within said housing cavity.

3. The high voltage electrically insulative shaft coupler according to claim 2 in which said shaft includes a flange within said cavity, said flange being wider than said retainer opening and narrower than said housing cavity, and said guide collar surrounds said shaft intermediate said flange and said retainer.

4. The electrically insulative shaft coupler according to claim 3 in which said guide collar has an outer diameter substantially equal to said first dimension, and said retainer surrounds said shaft but is spaced therefrom, said guide collar having portions extending between said retainer and said shaft to electrically insulate said retainer from said shaft.

5. A high voltage electrically insulative shaft coupler comprising,
  a. a first coupler element having a hollow housing, said housing including a cylindrical interior cavity having an inner diameter of a first dimension,
  b. a second coupler element including an elongated shaft, said shaft being formed to fit within said cavity,
  c. a cylindrical, elastomeric retention member secured to said shaft, said retention member having an outer diameter of a second dimension being greater than said first dimension, said retention member being formed of a dielectric material capable of withstanding high voltage of on the order of 50 kilovolts without breakdown,
  d. said shaft and retention member being installed axially within said cavity such that said retention member is compressed so that the outer diameter of said retention member is equal to said first dimension, said retention member being retained within said cavity without positive mechanical connection to said housing, whereby said retention member and said shaft will be axially rotated when said first coupler element housing is rotated, e. a dielectric first guide means having a depressed seat for accommodating an end of said shaft, said first guide means being disposed in fixed position adjacent the bottom of said housing cavity and being sufficiently hard and unyielding to retain said shaft end in position in axial registration with the interior of said cavity without substantial lateral movement, f. a flange on said shaft within said cavity, and g. a dielectric guide collar extending about in close fitting relationship with said shaft adjacent to and outward of said flange, said guide collar having an outer diameter substantially equal to said first dimension, being capable of withstanding high voltage and being sufficiently hard and unyielding to prevent substantial lateral movement of the portions of said shaft which are surrounded by said guide collar, whereby said first and second coupler elements are interconnected for rotation but prevented from substantial lateral movement with respect to one another and are insulated from the transmission of high voltage electrical current from one to another.

6. A high voltage electrically insulative shaft coupler according to claim 5 including a centrally apertured retainer surrounding said shaft but spaced therefrom and removably secured to said housing, said guide collar being positioned between said retainer and said flange.

7. A high voltage electrically insulative shaft coupler according to claim 6 in which said retainer comprises a cover to said cavity, and includes a central aperture for passage therethrough of said shaft, with the aperture defining portions of said retainer being in spaced relationship with respect to said shaft.

8. A high voltage electrically insulative shaft coupler according to claim 7 wherein said dielectric guide collar has a neck portion which extends through the aperture defining portions of said retainer to further electrically insulate said shaft from said retainer.

* * * * *